United States Patent [19]

Hashimoto

[11] Patent Number: 4,828,220

[45] Date of Patent: May 9, 1989

[54] CONTROL VALVE DEVICE

[75] Inventor: Kenji Hashimoto, Toyota, Japan

[73] Assignee: Aisin Seiki Kabushiki Kaisha, Kariya, Japan

[21] Appl. No.: 95,470

[22] Filed: Sep. 11, 1987

[30] Foreign Application Priority Data

Sep. 18, 1986 [JP] Japan ............................ 61-220166

[51] Int. Cl.$^4$ ............................................. F16K 31/08
[52] U.S. Cl. ................................. 251/129.06; 251/65; 137/625.4
[58] Field of Search ............................ 251/65, 129.06; 137/625.4

[56] References Cited

U.S. PATENT DOCUMENTS

| | | | |
|---|---|---|---|
| 2,991,805 | 7/1961 | Page | 251/65 X |
| 3,421,549 | 1/1969 | Webb | 251/65 |
| 4,176,822 | 12/1979 | Chadrick | 251/129.06 |

FOREIGN PATENT DOCUMENTS

| | | | |
|---|---|---|---|
| 0117195 | 8/1984 | European Pat. Off. | 251/129.06 |
| 2918377 | 11/1980 | Fed. Rep. of Germany | 137/625.4 |

*Primary Examiner*—A. Michael Chambers
*Assistant Examiner*—John C. Fox
*Attorney, Agent, or Firm*—Oblon, Fisher, Spivak, McClelland & Maier

[57] ABSTRACT

A control valve device including a body member having two input ports and an output port is provided with a chamber which communicated with each port therein. A valve member is received in the chamber and is freely movable in the chamber to control fluid communication between either of the input ports and the output port. A piezo-electric element engaged with the body member thrusts the valve member toward either of the input ports by the impression of voltage thereto. A valve hold member holds the valve member for closing either of the input ports by the valve member. The device is changed over by the impulse of the momentary transformation of the piezo-electric element generated when the piezo-electric element is impressed with the voltage.

10 Claims, 1 Drawing Sheet

CONTROL VALVE DEVICE

BACKGROUND OF THE INVENTION

1. Field of the Invention

The invention relates to control valve devices in general, and more particularly to a control valve device which controls fluid communication in fluid passages by a piezo-electric element which replaces a conventional electromagnetic mechanism. For example, this invention relates to control valve devices which are applied to change over use etc. of an air pressure device of an automobile.

2. Discussion of the Background

In a typical instance of a conventional control valve device of this type which is broadly utilized for the automobiles etc., there is a control valve device shown in FIG. 2.

As this control valve device, an electromagnetic valve having two change over position has been used. In this control valve device, a solenoid coil 1 is provided around an iron core 2 fixed to a body 9, and a plunger 3 is movably provided near the front end of the iron core 2 through a compression spring 7. In the center of the opposite end surface of the plunger 3 relative to the iron core 2, a seal surface 4 is formed by an element made of rubber etc. One input port 5a provided to the body 9 is normally blocked by the seal surface 4. The iron core 2 is provided with an axial bore which constitutes an other input port 5b.

The other hand, the body 9 is provided with an output port 6 in its part which communicates with a chamber receiving the plunger 3.

In the control valve device having the above construction, when the solenoid coil 1 is not electrically charged, the iron core 2 is not excited. As a result, the plunger 3 is pushed toward the left in FIG. 2 by the force of the spring 7 and blocks the one input port 5a by its seal surface 4. In this case, the other input port 5b communicates with the outlet port 6 through the gaps between the plunger 3 and the iron core 2, and between the body 9 and the plunger 3.

Next, when the electric current is applied to the solenoid coil 1, the iron core 2 is excited and pulls the plunger 3 by magnetic flux generated around the solenoid coil 1 through the body, a yoke 8, the plunger 3 and the iron core 2. Therefore, the seal surface 4 is separated from the one input port 5a so that the one input port 5a and the output port 6 communicate with each other.

In this kind of electromagnetic valve, as mentioned above, the change over operation of the valve member is performed by the initiation and termination of the application of electrical current to the solenoid coil 1. Therefore, the communication between two of the three ports is selectably changed over. So far as the control device is constituted as an electromagnetic valve, however, it is impossible to avoid the following disadvantages.

Namely, in the electromagnetic valve, the solenoid coil 1 consists of a winding, the iron core 2, the plunger 3 comprising a movable iron core and the yoke 8, all of which are indispensable elements of a magnetic circuit. As a result, the number of parts of the control valve device increases and the weight of the control valve device cannot but increase too.

Furthermore, when it is necessary that the plunger 3 is pulled to open the port 5a, it is necessary that the solenoid coil 1 is electrically excited as long as the plunger 3 is to be pulled. Therefore, the consumption of electric power in the control valve device increases.

Furthermore, in this electromagnetic valve, when it is installed in a pipe, it is not able to directly connect with the pipe since its weight is large. Therefore it is not only necessary to securely fix the control valve device to a fixed member such as a bracket but also considerable space for installation is required and the installation environment is bad.

SUMMARY OF THE INVENTION

A principle object of the present invention therefore is to provide a new and improved control valve device which is superior in performance of operation and response to a conventional electromagnetic valve.

A further object of the present invention is to provide a control valve device wherein the number of parts of the control valve device is a small and its weight is light.

Another object of the present invention is to provide a control valve device wherein its consumption of electric power is small.

Still another object of the present invention is to provide a control valve device wherein considerable space for installation is not required and the installation environment is good.

According to the invention, a control valve device for changing over a direction of fluid flow includes a body member having two inlet ports and an outlet port, the body member defining a chamber communicating with the inlet ports and the outlet port. A valve member is freely movable in the chamber for movement between two sealing positions for alternately sealing respective ones of the inlet ports. Valve hold means are associated with each of the inlet ports for maintaining the valve member at a respective one of the sealing positions. Means are provided for selectively thrusting the valve member away from a respective one of the sealing positions and towards an other one of the sealing positions. The thrusting means comprises a piezo-electric element associated with each of the ports, each one of the piezo-electric elements being positioned such that it will change volume in a direction so as to apply a thrusting force to the valve member when a voltage thereto is changed and the valve member is at a sealing position for a respective one of the inlet ports corresponding to that piezo-electric element.

The valve hold means preferably each comprise a valve hold member adhered to one of the piezo-electric elements, each of the valve hold members having a central hole in fluid tight communication with a respective one of the inlet ports. The valve hold members are preferably permanent magnets and the valve member is made of a magnetic substance and includes both a seal portion and plunger portions extending from opposite sides thereof.

As mentioned above, the valve member is thrusted toward to the opposite input port side by the impressing of the voltage to the piezo-electric element of the closed input port side and the valve member closes the opposite input port side at the same time. Thus, as the change over of the control valve device is performed by the impulse of the momentary transformation of the piezo-electric element, it is not necessary to provide the magnetic circuit. Therefore the number of the parts of the control valve device decreases and the weight of the control valve device decreases. Furthermore since no electric power is required for maintaining the change over state, the consumption of electric power can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
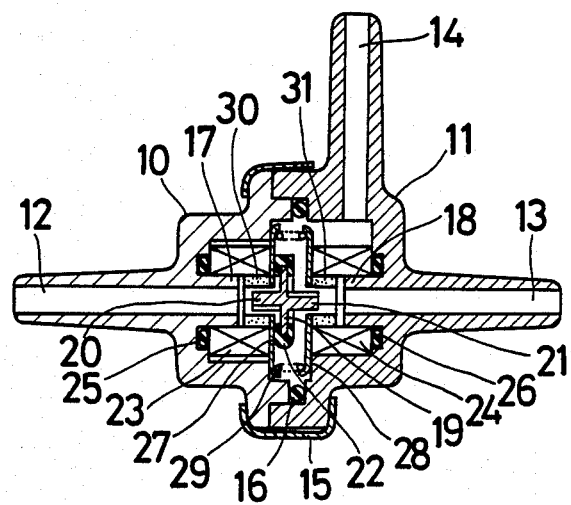
FIG. 1 is a sectional view of a control valve device constructed in accordance with one embodiment of the present invention.
Figure 2:
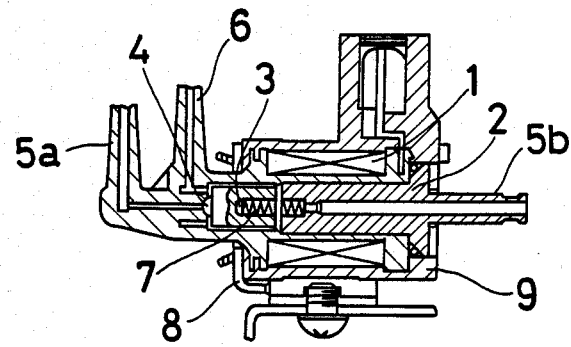
FIG. 2 is a sectional view of a conventional control valve device.

One embodiment of the present invention will hereinafter be described with reference to the accompanying drawings.

A body consists of two cases 10, 11, the one case 10 being provided with a first input port 12 and the other case 11 being provided with a second input port 13 and an output port 14 which intersects the input ports 12 and 13 at right angles.

These two cases 11, 12 are unified by supporting member 15, so that the first input port 12 and the second input port 13 oppose each other on a coaxial line. A chamber which communicates the three ports 12, 13 and 14 with each other is thus formed in the body. Cylindrical shaped projection portions 17 and 18 which oppose each other are respectively formed at the chamber end of each of the input ports 12 and 13. An O-ring 16 is interposed between the contacting faces of the cases 10 and 11 so that is seals the chamber and prevents pressure leaks from the chamber via the contacting faces of the cases 10 and 11.

A valve member 19 is held in the chamber so as to freely move. The valve member 19 is provided with the plunger portions 20 and 21 which project from the center of the opposite surfaces of the disc portion, and a groove is formed at the peripheral face of each of the plunger portions 20 and 21 so as to extend parallel the axial line of its respective plunger portion. A rubber seal member 22 is adhered to the outer circumference of the disc portion of the valve member 19.

Piezo-electric elements 23 and 24 which are each connected with a suitable electric source through an electric wire (not shown) are engaged with the projection portions 17 and 18, respectively. O-rings 25 and 26 are respectively interposed between the piezo-electric element 23 and 24 and the cases 10 and 11 so as to seal the pressure from each input port 12 and 13 respectively. Disc shaped plates 27 and 28 which are each formed with a central hole having about equal diameter to the diameter of the input ports 12 and 13 are concentrically adhered to the opposing surfaces of the piezo-electric elements 23 and 24. A compression spring 29 is interposed between the plates 27 and 28 so as to prevent the movement of the piezo-electric elements 23 and 24 by external forces such as the vibration arising during the running of an automobile.

The piezo-electric elements 23 and 24 may be in the form of a rectangular parallelpipeds or may be in the form of cylindrical shaped elements surrounding the projection portions 17 and 18. Each of the plates 27 and 28 is made of a comparatively hard material (for example the steel) and forms a sealing surface for both the case 10 and 11 and the seal member 22 of the valve member 19.

Cylindrical permanent magnets 30 and 31 which constitute the valve holding member of the present invention are adhered at their outer surfaces to the inner surfaces on the piezo-electric elements 23 and 24 so as to respectively oppose the projection portions 17 and 18. The cylindrical magnet 30, 31 are provided with inner holes having about equal diameter to the diameter of the input ports 12 and 13 and the diameter of the plunger 20 and 21. Plunger portions 20 and 21 of the valve member 19 are thus guided to the inner hole of a respective cylindrical magnet 30 and 31 and so can slidably move in the axial direction.

In operation, FIG. 1 shows the state in which the sealing member 22 of the valve member 19 contacts the plate 17 adhered to the piezo-electric element 23 of the first input port 12. In this state, the plunger portion 20 of the valve member 19 enters the inner hole of the cylindrical magnet 30 of the first input port 12, and the valve member 19 is pulled by the magnetic force of the cylindrical magnet 30 via the plate 27 and is airtightly held by the plate 27. Therefore the pressure transmitted from the first input port 12 is airtightly sealed by the valve member 19 and the output port 14 is communicated with the second input 13.

In this embodiment of the present invention, the magnetic force of the cylindrical magnet 30 or 31 airtightly holds the valve member 19 to the plate 27, 28 and so the valve member 19 is made of a magnetic substance.

Then, when the piezo-electric element 23 of the first port 12 is impressed with a voltage from a suitable electric source through the electric wire (not shown), the volume of the piezo-electric element 23 momentarily increases and the piezo-electric element 23 momentarily extends toward the opposite piezo-electric element 24 against the load of the compression spring 21. The impulse force of the momentary transformation of the piezo-electric element 23 is applied to the valve member 19, and so the valve member 19 is thrusted toward to the opposite piezo-electric element 24 and released from the hold of the cylindrical magnet 30. When the valve member 19 contacts the plate 28 of the second input port 13 it is similarly airtightly held to the plate 28 by the magnetic force of the cylindrical magnet 31. Thus the control valve device is changed over, and the pressure transmitted from the second input port 13 is airtightly sealed by the valve member 19 while the output port 14 is communicated with the first input port 12.

Next, when the piezo-electric element 24 of the second input port 13 is impressed with the voltage, the valve member 19 is thrusted toward the first input port 12 and again contacts the plate 27. The state shown by FIG. 1 is thus again maintained by the magnetic force of the cylindrical magnet 30. Thus it is possible to change over the control valve device by means of alternate impressions of the voltage to either of two opposite piezo-electric elements.

According to the present invention, since the driving force for giving the thrust of the valve member is derived from the momentary transformation of the piezo-electric element when the voltage is impressed thereon, it is possible to simplify the structure of the control valve device and to decrease the number of the indispensable parts so that the device may be miniaturized. The change over of the control valve device is initiated by the impression of a voltage to the piezo-electric element for a few msec. and the changeover state can subsequently be maintained without the further impression of the voltage. Therefore, it is possible to greatly decrease the consumption electric power in the control valve device.

Furthermore, according to the present invention, since the piezo-electric element itself is small-sized, for example a few mm square, it is possible to miniaturized and to lighten the control valve device. As a result, when the control valve device of the present invention is, for example, incorporated into the rubber hose of a change over system for an automobile emission control device, an additional member for fixing the control valve device is not necessary and it is possible to directly incorporate the control valve device into the rubber hose. Moreover, a large space for fixing the control valve device is not necessary.

Furthermore, the control valve device of the present invention is superior in response as compared with to the conventional electromagnetic valve. According to the inventors' experiment, it is confirmed that the control valve device of the present invention can be changed over at a speed of 7 ~ 9 times as fast as conventional electromagnetic valve.

It should be understood that the preferred embodiment of the present invention has been described herein in considerable detail and that certain modifications, changes and adaptations may be made therein by those skilled in the art and that it is hereby intended to cover all modifications, changes and adaptations thereof falling within the scope of the appended claims.

What is claimed as new and desired to be secured by Letters Patent of the United States is:

1. A control valve device for changing over a direction of fluid flow, comprising:
   a body member having two inlet ports and an outlet port, said body member defining a chamber communicating with said inlet ports and said outlet port;
   a valve member freely movable in said chamber for movement between two sealing positions for alternately sealing respective ones of said inlet ports;
   valve hold means associated with each of said inlet ports for maintaining said valve member at a respective one of said sealing position; and
   means for selectively thrusting said valve member away from a respective one of said sealing positions and towards an other one of said sealing positions, wherein said thrusting means comprises a piezo-electric element associated with each of said ports, each one of said piezo-electric elements being positioned such that said one piezo-electric element will change volume in a direction so as to apply a thrusting force to said valve member when a voltage to said one piezo-electric element is changed and said valve member is at a sealing position for a respective one of said inlet ports corresponding to said one piezo-electric element.

2. The device of claim 1 wherein said inlet ports are in coaxial linear opposition to one another.

3. The device of claim 2 including opposing cylindrical projection portions of said inlet ports extending into said chamber.

4. The device of claim 3, wherein said piezo-electric elements are each engaged with one of said projection portions.

5. The device of claim 4, wherein said valve hold means comprises a valve hold member adhered to each of said piezo-electric elements, each of said valve hold member having a central hole in fluid tight communication with a respective one of said inlet ports.

6. The device of claim 5, wherein said valve member comprises:
   a seal portion; and
   plunger portions extending from opposite sides of said seal portion and in such directions that one of said plunger portions is inserted in a central hole of a respective one of said valve hold members when said valve member is in each of said two sealing positions.

7. The device of claim 6, wherein valve hold members are permanent magnets and said valve member is made of a magnetic substance.

8. The device of claim 7 including valve seat means comprising a disc plate adhered to opposing faces of each of said piezo-electric elements, wherein said seal portion of said valve member sealingly engages one of said disc shaped plates in each of said sealing positions.

9. The device of claim 8 including a spring biasing apart said disc shaped plates.

10. The device of claim 7 wherein said piezo-electric elements and said valve hold members are cylindrical.

* * * * *